March 10, 1936.　　　　W. D. CROWELL　　　　2,033,759
VENTILATING APPARATUS FOR VEHICLE BODIES
Original Filed May 18, 1933
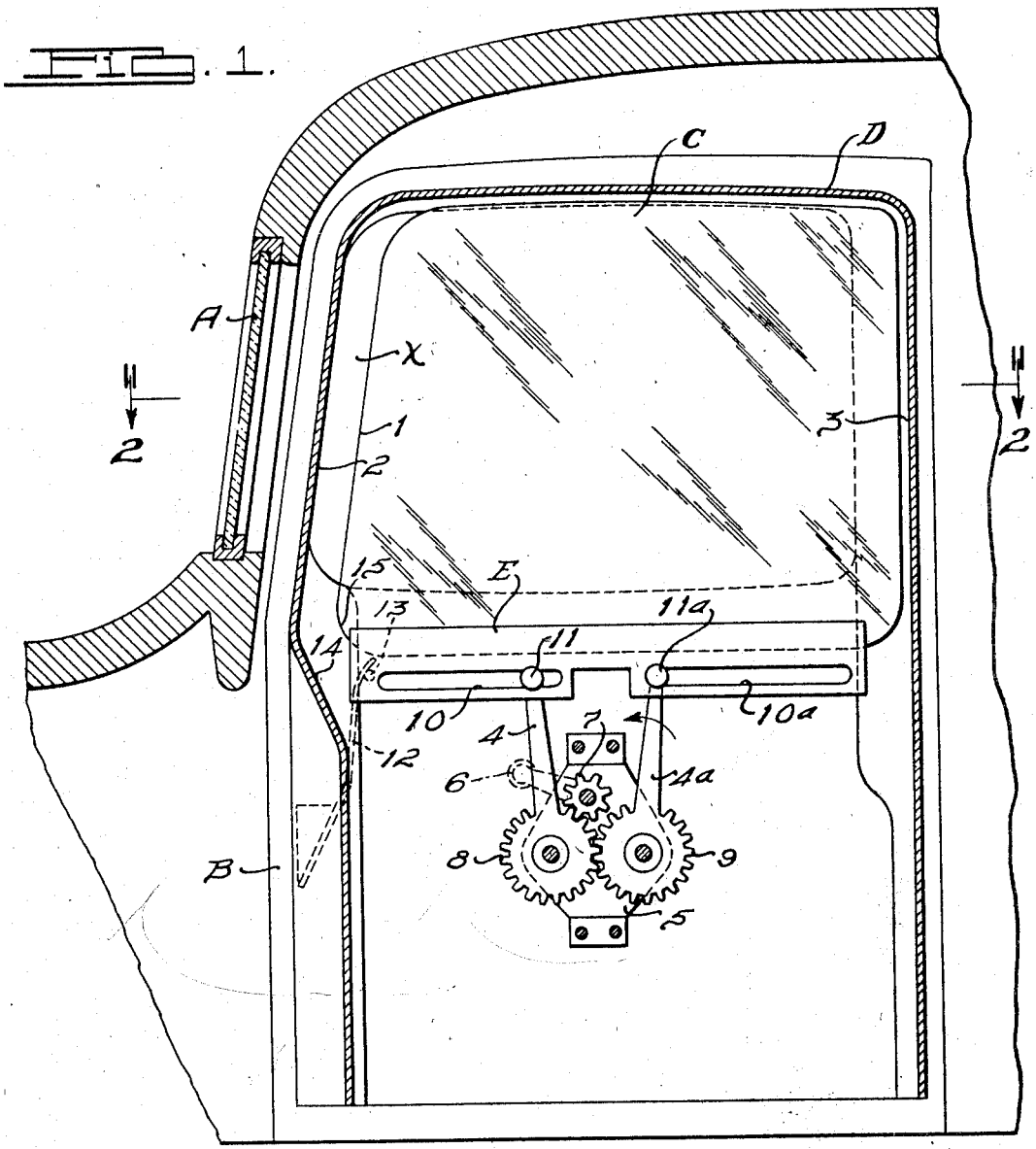
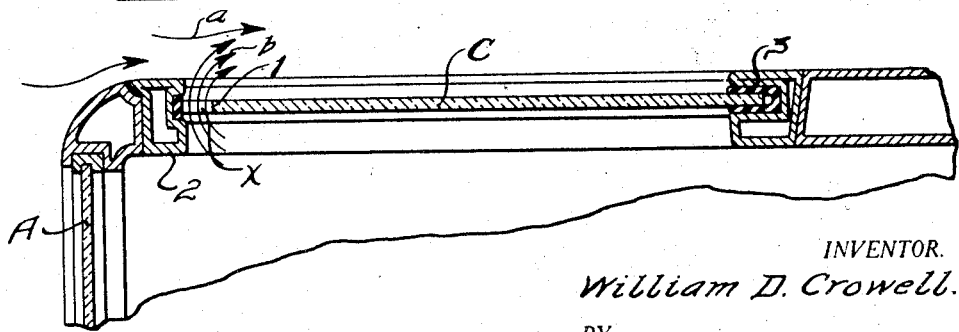
INVENTOR.
William D. Crowell.
BY
Dike, Calvert & Gray
ATTORNEYS.

Patented Mar. 10, 1936

2,033,759

UNITED STATES PATENT OFFICE 2,033,759

VENTILATING APPARATUS FOR VEHICLE BODIES

William D. Crowell, St. Louis, Mo., assignor to Automobile Ventilation, Inc., Detroit, Mich., a corporation of Michigan Original application May 18, 1933, Serial No. 671,641. Divided and this application August 24, 1934, Serial No. 741,313. Renewed January 11, 1936

16 Claims. (Cl. 296—44)

This invention relates to ventilating apparatus for vehicle bodies of the type or kind that have provision for producing a relatively narrow, substantially upright suction opening or ventilating slot in a side wall of the body, through which foul air, gases, smoke and the like are withdrawn from the interior of the body when the vehicle is in forward motion, without liability of air blowing into the body through said slot or opening, and causing annoyance or discomfiture to the occupants of the vehicle; and is a division of my co-pending application, Serial No. 671,641, filed May 18, 1933.

An object of my invention is to provide a novel means for efficiently ventilating an automobile body or other vehicle body without adding materially to the cost of same, and without marring or changing the appearance of the body.

Another object is to provide a vehicle ventilating system wherein the conventional one-piece automobile window or door glass may be raised vertically while maintaining a ventilating opening at its forward edge when the glass has reached its fully elevated position and also wherein the glass may be adjusted horizontally when in its fully raised position to close the ventilating opening and vice versa.

Another object of my invention is to provide a vehicle ventilating apparatus that is equipped with a window operating mechanism which is so constructed or designed that it is adapted to be actuated to raise or lower the window and also to bodily move the window horizontally and forwardly, when fully elevated, into position to close a ventilating slot at its forward edge.

Another object is to provide a vehicle ventilating apparatus that is equipped with a window operating mechanism which, in addition to having the desirable feature or characteristic above pointed out, also has provision for maintaining or holding the window in its ventilating position.

Another object of my invention is to provide a vehicle ventilating apparatus comprising a one-piece window mounted so as to be capable of being raised and lowered and also moved horizontally in its plane to produce or to close a ventilating slot at one upright edge of the window, and an operating mechanism for said window designed or constructed to cause the window to move in its plane horizontally and automatically in a direction to produce the ventilating slot when the window is being lowered, and to move in the reverse direction to close the ventilating slot when the window is being raised.

Another object is to provide a novel form of guiding means for an adjustable automobile window or door glass.

Other objects of the invention will appear from the following description and appended claims, when considered in connection with the drawing forming a part of this specification.

In said drawing:

Fig. 1 is a fragmentary longitudinal section, partly in elevation, illustrating the application of my invention to the left hand front door of a closed automobile body; and Fig. 2 is a slightly modified section taken substantially along the line 2—2 of Fig. 1.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

I have herein illustrated my invention applied to or embodied in a vehicle side door window whose front upright frame member slopes rearwardly or is slightly inclined, but I wish it to be understood that it is immaterial, so far as my invention is concerned, whether said front frame member is a vertical member or is a forwardly inclined or rearwardly inclined member. The sliding window that forms one element of my improved ventilating apparatus is herein illustrated as being constructed from a single piece of heavy glass whose top, front and rear edges are not encased in or protected by a sash frame, but it will be obvious that it is immaterial whether the window is formed from a thick piece of glass having no marginal binding, or formed from a piece of glass mounted in or secured to a sash frame. The window is constructed in the form of a single unit, so that it will constitute a complete closure for the window opening with which it is combined. The window may either be mounted in a stationary portion of the side wall of the vehicle body in such a way that it can be raised, lowered and also moved horizontally forwardly and rearwardly, as hereinafter described, or it may be mounted in a movable portion of the side wall, such, for example, as in a front door or a rear door of the kind conventional automobile bodies are equipped with.

In Figure 1 of the drawing A designates a conventional transversely-disposed wind shield at the front end of an automobile body, B designates the front door in the left hand side wall of said body, and C designates an adjustable window mounted in said door so as to form the upper portion of the door. The window C is preferably formed from a single piece of thick or heavy glass, and is mounted in the door B in such a way that the window can be opened by lowering it or moving it downwardly into a pocket formed in the lower half of the door. When the window C is in its closed or fully raised position, it is surrounded by a window frame D that constitutes an integral portion of the door.

The window C, above described, is mounted in a different manner from the conventional one-piece automobile window or door glass, in that in addition to being capable of being moved vertically into and out of a closed position, it is also capable of being moved horizontally into a ventilating position, wherein one of its upright edges, preferably its front edge 1, is spaced away from the front upright member 2 of the window frame D to produce a ventilating slot or suction opening $x$, as shown in Figures 1 and 2. When the vehicle is in forward motion, the air that rushes rearwardly over the side wall of the body, as indicated by the arrows $a$ in Figure 2, creates a suction or partial vacuum on the ventilating slot $x$ that causes foul air, gases, smoke and the like in the interior of the vehicle body to be effectively withdrawn from the body through said slot, as indicated by the arrows $b$ in Figure 2. Due to the fact that the ventilating slot $x$ is disposed vertically or substantially so, in close proximity to the front upright member 2 of the window frame, and is relatively narrow (usually about an inch or so in width), there is little or no tendency for rain to beat into the vehicle through said slot. When it is desired to close the ventilating slot $x$ and thus cut off the circulation of air in the body, the window C is moved forwardly so as to produce a tight joint between the front edge 1 of same and the front upright member 2 of the window frame D.

The front upright member 2 of the window frame that coacts with the front edge portion of the window may be of various shapes in cross section. In Figure 2 said member 2 is illustrated as being provided with a relatively shallow groove that is adapted to house the extreme front edge of the window or a strip of packing material with which the front edge of the window contacts to produce a tight joint.

It is immaterial, so far as my broad idea is concerned, what type of means of mechanism is employed to operate or actuate the window C, so as to raise or lower the window, or to produce a ventilating slot or a tight joint between the front edge of the window and the front upright member 2 of the window frame. The operating mechanism may comprise separate parts or portions adapted to be operated independently of each other, to effect the vertical movement and horizontal movement of the window; it may comprise a conventional window raising and lowering mechanism, and a handle, finger piece or similar part attached to the window so as to enable the window to be manually moved horizontally; or said mechanism may consist of an operating structure or means provided with a single part that can be manipulated to effect the vertical movement of the window and also the horizontal movement of the window. I prefer to equip my improved ventilating apparatus with a window operating mechanism which is so constructed or designed that the user can actuate a crank or the like to raise and lower the window, and also to move the window horizontally either to produce the ventilating slot, or to close said slot. Preferably, said window operating mechanism is so designed that if it is actuated to adjust the window vertically, the window will automatically move horizontally to produce the ventilating slot, as hereinafter described.

In Figure 1 the window operating mechanism comprises two rock arms 4 and 4ª oscillatingly mounted on a supporting member 5 positioned in the window pocket in the lower portion of the door B, and an operating crank 6 accessible from the interior of the vehicle body for actuating the arms 4 and 4ª, the operating crank 6 herein illustrated being attached to a rotatable pinion 7 on the supporting member 5 which meshes with a gear 8 on the rock arm 4. The gear 8 meshes with a gear 9 on the rock arm 4ª, and hence, when the operating crank 6 is rotated in one direction, the arms 4 and 4ª will swing downwardly to lower the window C, and when said operating crank is rotated in the opposite direction, said arms 4 and 4ª will swing upwardly to raise said window. The upper ends of the arms 4 and 4ª are operatively connected with the window C preferably by means of a horizontally disposed member E attached to or combined in any suitable way with the bottom edge portion of the window and provided with two horizontally-disposed, elongated slots 10 and 10ª that receive studs or bolts 11 and 11ª mounted in the upper ends of the arms 4 and 4ª, respectively, the slots 10 and 10ª being of such length as to provide for the necessary relative movement between the arms 4 and 4ª and the member E when said arms swing in an arc to lower or raise the window C. In the form of my invention herein illustrated the member E is provided with a channel-shaped portion that receives the bottom edge of the piece of glass that constitutes the window C, and said member E is also provided with depending flanges or webs in which the elongated slots 10 and 10ª are formed.

The elongated slots 10 and 10ª in the member E are of such length that when the window C is in its closed or raised position, with the front edge 1 of the window glass spaced rearwardly from the member 2 of the window frame, the bolt or stud 11ª in the upper end of the operating arm or lever 4ª will be in engagement with the forward or inner end of the slot 10ª, and the stud 11 in the upper end of the arm or lever 4 will be spaced away from the inner end of the slot 10. If it becomes necessary or desirable to close the ventilating slot or opening $x$, the user simply moves the operating crank 6 in a counter-clockwise direction, whereupon the arm 4ª will swing in the direction of the arrow in Figure 1, and the stud or bolt 11ª which bears against the forward end of the slot 10ª, will move the member E, together with the window glass C forwardly until its forward edge 1 abuts the frame member or channel 2, thus closing the ventilating slot or opening. After the window glass has thus been closed, it will remain in closed position, since the frictional engagement between the pinion 7 and the gear 8 is sufficient to maintain the parts in their respective positions with the ventilating slot closed. The elongated slot 10 is of sufficient length so that the stud 11 will not bind against its inner end during the shifting of the glass C horizontally in its plane to closed position.

In accordance with my invention, when the window glass is moved upwardly into its substantially fully raised position, the ventilating slot $x$ will be produced automatically at the front edge of the glass, and if it is desired to close said ventilating slot, it is necessary for the user to operate the crank 6, as previously described. As shown, there is provided a leaf spring 12 which is arranged on the interior of the window pocket in the door and which has its lower end fixed to the window frame and its upper end engaging a laterally projecting stud or pin 13 carried by the member E. The spring has a tendency to expand and exert pressure or a rearward thrust on the pin, thus tending to maintain the member E and the window glass in their rearmost positions with the forward edge 1 of the glass away or rearwardly spaced from the window frame member 2. Thus, when the window is cranked to its uppermost or closed position, the ventilating slot $x$ is automatically provided, it requiring further manipulation or rotation of the crank 6 to close the window glass by shifting it horizontally against the action of the spring 12. It is to be noted that the front channel or guiding device 2 is provided with a cam or inclined surface 14 which coacts with the front lower corner 15 of the window glass to positively shift the window rearwardly during the operation of lowering it, in the event the window sticks, or in the event the spring 12 fails to act properly.

When the operating mechanism is actuated to raise the window, the glass will move upwardly in a substantially straight path and will come to rest in its fully raised position with its front edge 1 spaced rearwardly away from the upright member 2 to produce a ventilating slot at the front edge of the window. As previously mentioned, the spring 12, cooperating with the stud 13, serves to maintain the window glass in this ventilating position. With the window glass positioned forwardly against the frame member 2 so as to completely close the window opening, if the user starts to turn the crank in a direction to lower the window, the spring 12 functions to shift the glass rearwardly in its plane. If, for any reason, the spring fails to act properly, the front lower corner 15 of the window glass will strike against the inclined surface 14 of the front channel and positively move the window glass rearwardly as it moves downwardly into the window well or pocket formed in the door. As shown, the window glass C has unbound edges with the exception of its lower edge which is engaged by the channel or retainer member E. It will be understood, however, that the free edges if the glass may, if desired, be bound by suitable framing members.

It will be understood that the window glass may be mounted in the window frame of the door or body of any conventional automobile or power propelled vehicle. The glass is mounted to be raised and lowered, and it is understood that the terms "vertical" or "vertically" as used in the appended claims in respect to the movement of the glass are to be construed as defining the general upward and downward direction of movement of the glass.

I claim:

1. A vehicle window ventilator comprising a window frame, a window mounted for vertical movements in said frame with the front upright edge thereof normally spaced from the adjacent edge of the frame to provide a ventilating slot, and means rendered operable by movement of the window to a predetermined position of vertical adjustment for shifting said window in a horizontal direction thereby to close the slot.

2. A vehicle window ventilator comprising a window frame having a window opening therein, a unitary window large enough to entirely close said opening and mounted in said frame for lateral movement between closing position and a ventilating position, in which there is left a ventilating slot at one side of the opening, and for vertical movement, and a single manual control operable to raise and lower the window in ventilating position and to shift it laterally between closing and ventilating positions when raised.

3. A ventilating window, including a window frame having a relatively shallow glass runway on one side thereof, a relatively deep glass runway on the opposite side thereof, a window glass mounted for vertical and horizontal sliding movement in said runways, means for sliding said glass vertically in the deep runway while an edge of the glass is maintained outside of said relatively shallow glass runway to form a ventilating opening, and means for shifting said glass in its plane to close said opening.

4. A ventilating window for a vehicle body including a window frame having a relatively shallow glass runway at its forward side and a relatively deep glass runway at its rear side, a window glass mounted in said runways, means for sliding said glass vertically while providing a ventilating opening between the forward edges of the glass and frame, and means for sliding said glass horizontally to close said opening.

5. In a vehicle body, the combination of a sliding window mounted so as to be capable of being moved vertically to open or close the same, and also moved horizontally so as to produce a ventilating slot at one upright edge of the window, and an operating mechanism for said window comprising a pair of rock arms provided with parts that engage elongated guideways in a member attached to the lower edge of the window, the said part on one of said rock arms being arranged so as to cooperate with said member to move the window forwardly and horizontally in its plane, when the window is in its substantially fully raised position to close said ventilating slot.

6. In a vehicle body having a window opening, the combination of a sliding window glass adapted to be moved upwardly and downwardly while maintaining a ventilating slot at the forward edge of the glass when the glass is in elevated position, and operating mechanism for raising and lowering said window, said mechanism having means for moving the window horizontally in its plane to close said ventilating slot while actuating said mechanism in a direction to elevate the window.

7. A ventilating window including a window frame having a relatively shallow glass runway on one side thereof, a relatively deep glass runway on the other side thereof, a window glass mounted for vertical and horizontal sliding movement in said runways, and means for sliding said glass vertically in the deep runway while an edge of the glass is maintained outside of said relatively shallow glass runway to form a ventilating opening.

8. A ventilating window for a vehicle body including a window frame having a relatively shallow glass runway at its forward side and a relatively deep glass runway at its rear side, a window glass mounted in said runways, means for sliding said glass vertically while providing a ventilating opening between the forward edges of the glass and frame, and means for shifting said glass in its plane in an angular direction with respect to said vertical movement to close said opening.

9. A ventilating window for a vehicle body including a window frame having a relatively shallow glass runway at its forward side and a relatively deep glass runway at its rear side, a window glass mounted in said runways, means for sliding said glass vertically while providing a ventilating opening between the forward edges of the glass and frame, and means for sliding said glass horizontally to close said opening, said last means being operative only when the glass is substantially fully elevated.

10. A ventilating window for a vehicle body including a window frame having a relatively shallow glass runway at its forward side and a relatively deep glass runway at its rear side, a window glass mounted in said runways, a swinging arm for sliding said glass vertically while providing a ventilating gap between the forward edge of the glass and the frame, and means actuated by said arm for sliding the glass forwardly to close said gap.

11. In a vehicle body having a window opening, a glass panel mounted to slide vertically in said opening and horizontally in the plane of the glass, and regulator means for shifting said panel in successive movements vertically into elevated position while maintaining a ventilating opening along one upright edge of the glass and then horizontally to close said opening.

12. In a vehicle body having a window opening, a window glass mounted to slide vertically in said opening and horizontally in the plane of the glass, a retainer member secured to the lower edge of the glass, a pair of swinging arms slidingly engaging said member for shifting the window vertically while maintaining a ventilating opening at one upright edge of the glass, and an extension carried by one arm and cooperating with a portion of said member for shifting the window horizontally to close said opening.

13. In a vehicle body having a window opening, a window glass mounted to slide vertically in said opening and horizontally in the plane of the glass, a retainer member secured to the lower edge of the glass, front and rear swinging arms slidingly engaging said member for shifting the window vertically while maintaining a ventilating opening at the forward edge of the glass, and an extension carried by the rear arm and cooperating with a portion of said member for shifting the window horizontally to close said opening.

14. In a vehicle body having a window opening, a glass panel mounted to slide vertically in said opening and horizontally in the plane of the glass, and regulator means for shifting said panel in successive movements vertically into elevated position while maintaining a ventilating opening along one upright edge of the glass and then horizontally to close said opening, and a single operating device for said regulator means.

15. A vehicle window ventilator comprising a window frame, a window mounted for vertical movements in said frame with an upright edge thereof normally spaced from the adjacent edge of the frame to provide with said edge a ventilating slot in various positions of the window, and a single manual control for raising and lowering the window and effecting a shifting of the window in its plane when in raised position to close the ventilating slot.

16. A vehicle window ventilator comprising a window frame, a window entirely closing said opening and mounted for vertical movement in said frame with an upright edge thereof normally spaced from the adjacent edge of the frame to provide a ventilating slot, and means for raising and lowering said window and including means operable when the window is raised for shifting the window in its plane to close the ventilating slot.

WILLIAM D. CROWELL.